(12) United States Patent
Chinnaveerappan

(10) Patent No.: US 7,804,052 B2
(45) Date of Patent: Sep. 28, 2010

(54) METHODS AND APPARATUSES FOR PIXEL TESTING

(75) Inventor: Kalairaja Chinnaveerappan, Boise, ID (US)

(73) Assignee: Aptina Imaging Corp., Grand Cayman (KY)

( * ) Notice: Subject to any disclaimer, the term of this patent is extended or adjusted under 35 U.S.C. 154(b) by 558 days.

(21) Appl. No.: 11/808,375

(22) Filed: Jun. 8, 2007

(65) Prior Publication Data

US 2008/0303905 A1 Dec. 11, 2008

(51) Int. Cl.
*H01L 27/00* (2006.01)
*H01J 40/14* (2006.01)

(52) U.S. Cl. ............... 250/208.1; 250/214 R

(58) Field of Classification Search ........... 250/208.1, 250/214 R, 214.1; 257/414, 431–470; 348/272–283, 348/294–324, 187, 222.1; 324/500, 501, 324/527
See application file for complete search history.

(56) References Cited

U.S. PATENT DOCUMENTS

| | | | | |
|---|---|---|---|---|
| 5,654,537 A | * | 8/1997 | Prater ................ | 250/208.1 |
| 6,118,482 A | * | 9/2000 | Clark et al. ............ | 348/308 |
| 6,489,798 B1 | * | 12/2002 | Scott-Thomas et al. | 324/765 |
| 6,591,011 B1 | | 7/2003 | Nielsen | |
| 6,618,084 B1 | | 9/2003 | Rambaldi et al. | |
| 6,950,134 B2 | | 9/2005 | Miida | |
| 7,075,049 B2 | | 7/2006 | Rhodes et al. | |
| 7,085,408 B1 | * | 8/2006 | Chung-Chi Jim ........ | 382/149 |
| 2002/0030753 A1 | * | 3/2002 | Kramer et al. .......... | 348/308 |
| 2004/0251394 A1 | | 12/2004 | Rhodes et al. | |
| 2006/0202108 A1 | | 9/2006 | Hong | |

FOREIGN PATENT DOCUMENTS

EP   1 143 709 A2   10/2001

OTHER PUBLICATIONS

Lin et al., "In Process Functional Testing of Pixel Circuit in AM-OLEDs," *IEEE Transactions on Electron Devices*, vol. 52, No. 10, Oct. 2005, pp. 2157-2162.
Hornsey et al., "Nonoptical Characterization Techniques for Uncooled Microbolometer Infrared Sensors," *IEEE Transactions on Electron Devices*, vol. 47, No. 12, Dec. 2000, pp. 2294-2300.
Ei-Sayed Eid, "Pre-Amplifier Per Pixel Charge Injection Device Image Sensor," *SPIE*, vol. 2415, Apr. 10, 1995, pp. 292-302.
International Search Report with Written Opinion (Jul. 28, 2008).

* cited by examiner

*Primary Examiner*—Que T Le
*Assistant Examiner*—Pascal M Bui-Pho
(74) *Attorney, Agent, or Firm*—Dickstein Shapiro LLP

(57) ABSTRACT

Methods and apparatuses for non-optical testing of imaging devices having an array of pixels are provided. One or more pixels are tested by setting the photoconversion device and/or a floating diffusion region to a known voltage level that is different from that used to operate the pixel during non-test operation. The pixel is then sampled and compared to an expected value.

27 Claims, 5 Drawing Sheets

METHODS AND APPARATUSES FOR PIXEL TESTING

FIELD OF THE INVENTION

The embodiments described herein relate generally to imaging devices and, more specifically, to a method and apparatus for testing pixels employed in such devices.

BACKGROUND OF THE INVENTION

Solid state imaging devices, including charge coupled devices (CCD), CMOS imaging devices, and others, have been used in photo imaging applications. A solid state imaging device circuit includes a focal plane array of pixel cells or pixels, each one including a photoconversion device, which may be a photogate, photoconductor, or a photodiode having a doped region for accumulating photo-generated charge. For CMOS imaging devices, each pixel has a charge storage region, formed on or in the substrate, which is connected to the gate of an output transistor that is part of a readout circuit. The charge storage region may be constructed as a floating diffusion region. In some CMOS imaging devices, each pixel may further include at least one electronic device such as a transistor for transferring charge from the photoconversion device to the storage region and one device, also typically a transistor, for resetting the storage region to a predetermined charge level prior to charge transference.

In a CMOS imaging device, the active elements of a pixel perform the necessary functions of: (1) photon to charge conversion; (2) accumulation of image charge; (3) resetting the storage region to a known state; (4) transfer of charge to the storage region; (5) selection of a pixel for readout; and (6) output and amplification of a signal representing pixel charge. Photo charge may be amplified when it moves from the initial charge accumulation region to the storage region. The charge at the storage region is typically converted to a pixel output voltage by a source follower output transistor.

FIG. 1 is an electrical diagram of a conventional pixel cell 10. As illustrated in FIG. 1, the pixel 10 includes a photoconversion device 50. The photoconversion device 50 is illustratively a photodiode and may be a p-n junction photodiode, a Schottky photodiode, or any other suitable photoconversion device. There is an electrical connection between photodiode 50 and a supply voltage (VAA-PIX) through transistor 25. Transistor 25 is depicted as an anti-blooming transistor, which can be operated to allow excess collected charge to drain to VAA-PIX.

The pixel 10 also includes a transfer transistor 26 for transferring charge from the photoconversion device 50 to the floating diffusion region 16. Floating diffusion region 16 is coupled to a source/drain region of reset transistor 18, which operates to reset the floating diffusion region to a predetermined voltage, e.g., VAA-PIX. The floating diffusion region 16 is also coupled to the gate of a source follower transistor 40, which receives the charge from the floating diffusion region 16 and provides an output signal based on the stored charge to a source/drain terminal of a row select transistor 42. The row select transistor 42 operates to couple the signal produced by source follower transistor 40 to the column line 31 where it is read out.

Pixel 10 can be included in an array of pixels within an imaging device (not shown). Typically, pixels 10 in imaging devices are tested by the manufacturer and circuitry adjustments are performed if necessary. Conventional testing is time consuming and requires analysis of the performance of the imaging device when exposed to a light source. In addition to the time needed for optical testing, significant time is needed to set up conventional testing equipment. Further, with conventional testing techniques, the pixels 10 of the imaging device can not readily be tested by end users of the device to make adjustments over the life of the imaging device. Accordingly, there is a need for a testing methods and apparatuses for an imaging device that may be performed without a light source and by end users.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those of ordinary skill in the art to make and use them, and it is to be understood that structural, logical, or procedural changes may be made to the specific embodiments disclosed.

Figure 1:
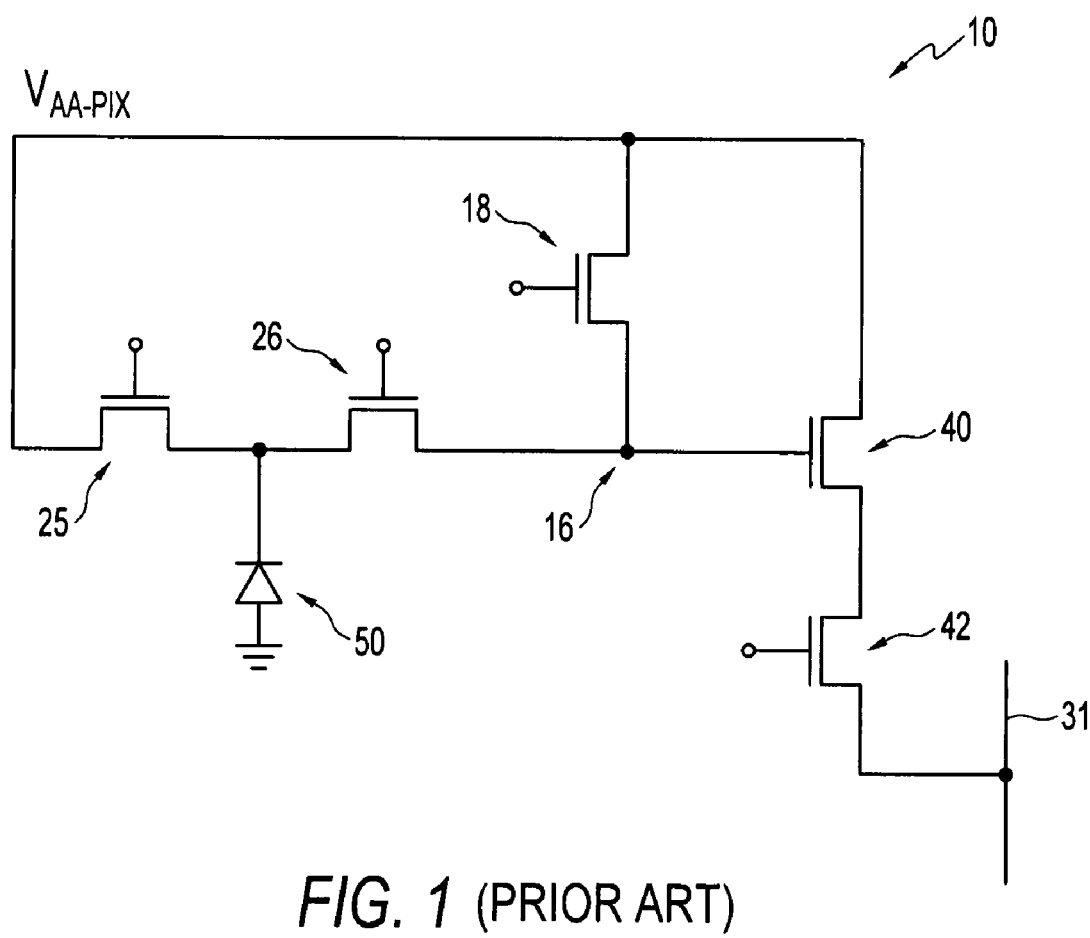
FIG. 1 is an circuit diagram of a conventional pixel cell.
Figure 2:
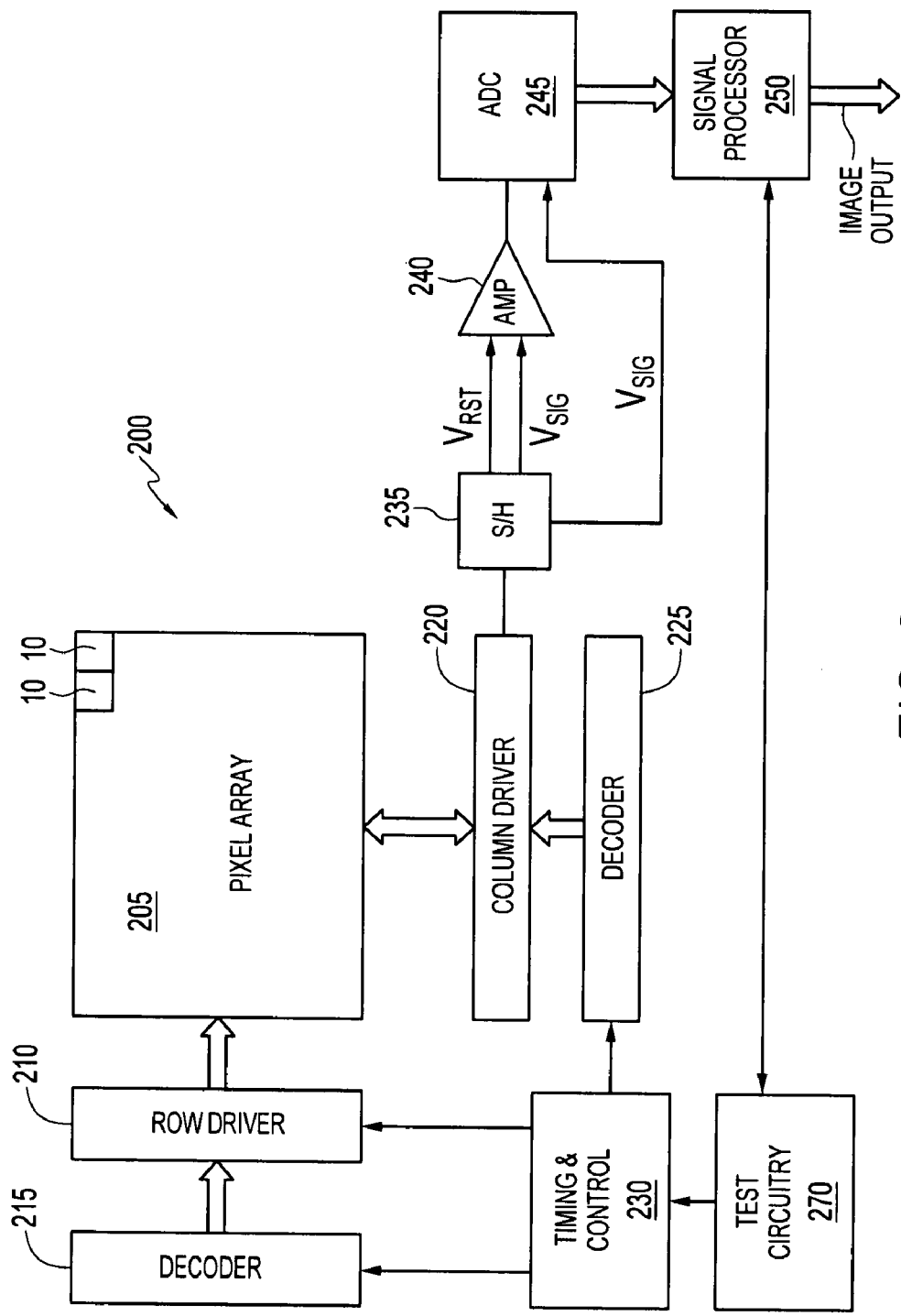
FIG. 2 is a block diagram of an imaging device according to an embodiment of the invention.

FIG. 2 shows a CMOS imaging device 200. The imaging device 200 includes a pixel array 205 having a plurality of pixels 10 (FIG. 1) arranged in columns and rows. It should be noted that although pixel 10 is shown as a 5-transistor (5T) configuration with an antiblooming transistor 26, other pixel configurations may be employed in imaging device 200. For example, pixels can include a shutter transistor coupled between the photoconversion device 50 and the transfer transistor 26 to have a 6-transistor (6T) configuration; or the antiblooming transistor 25 may be omitted such that a pixel 10 has a 4-transistor (4T) configuration.

The imaging device 200 includes test circuitry 270 for testing the pixels 10 as described in more detail herein. Under control of the test circuitry 270, one or more pixels 10 output test signals. The test circuitry also controls processing of the test signals, which can provide information about the characteristics of the pixels 10.

During testing operations, the test circuitry controls a timing and control circuit 230, which in turn controls address decoders 215, 225 for selecting the appropriate row and column lines for readout. Timing and control circuit 230 also controls the row and column driver circuitry 210, 220 so that they apply driving voltages to the drive transistors of the selected row and column lines.

During testing operations of the imaging device 200, the pixel output signals include a pixel signal $V_{SIG}$ which is obtained and read out according to the method described below in connection with FIGS. 3A and 3B. The pixel signal $V_{SIG}$ is digitized by an analog-to-digital converter 245.

Optionally, a reset signal $V_{RST}$ can be read out of the floating diffusion region 16 after it is reset by the reset transistor and the pixel signal $V_{SIG}$ can be read out subsequent to the reset signal $V_{RST}$. If a reset signal $V_{RST}$ is obtained, the $V_{RST}$ and $V_{SIG}$ signals are sampled by the sample and hold circuit 235 and are subtracted by a differential amplifier 240, to produce a differential signal $V_{RST}$–$V_{SIG}$. This difference signal is digitized by an analog-to-digital converter 245.

The digitized pixel signal $V_{SIG}$ (or optionally, the digitized differential signal $V_{RST}$–$V_{SIG}$) is fed to a signal processor 250 for processing under control of the test circuitry 270. The signal ($V_{SIG}$ or $V_{RST}$–$V_{SIG}$) provided for processing is referred to herein as the test signal. The signal processor 250 can be located on or off the chip on which the pixel array 205 is located. The differential signal $V_{RST}$–$V_{SIG}$ can be amplified as a differential signal and directly digitized by a differential analog to digital converter.

Figure 3A:
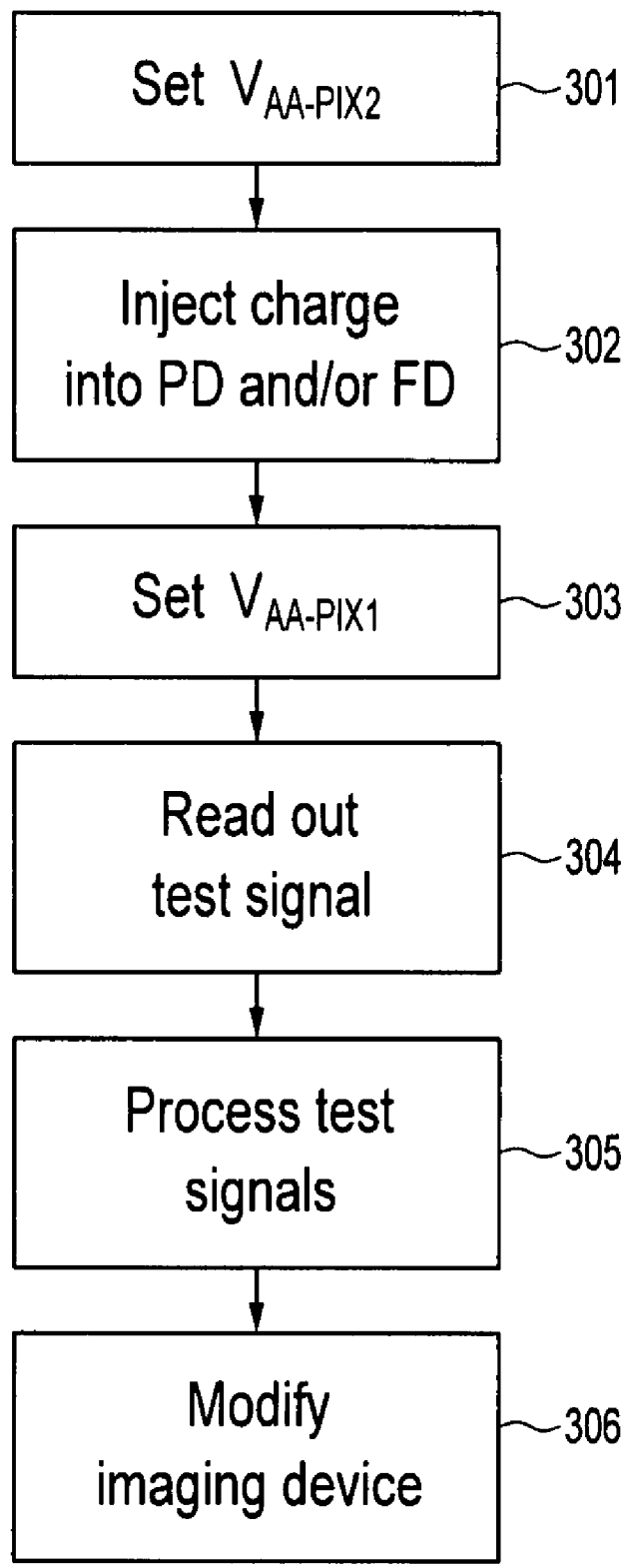
FIG. 3A is a flow chart showing a method of testing pixels that is employed using the imaging device of FIG. 2.

FIG. 3A is a flow chart depicting a method of testing the pixels 10 of imaging device 200. FIG. 3B is a potential well diagram of a pixel 10 tested according to the method shown in FIG. 3A. For purposes of simplicity, the testing method is described in connection with a single pixel 10. It should be understood that more than one pixel 10 or all pixels 10 of array 205 can be tested.

Under control of the test circuitry 270 (FIG. 2), in step 301, the pixel voltage, $V_{AA\text{-}PIX}$, is changed from an operational level, $V_{AA\text{-}PIX1}$, to a predetermined test voltage, $V_{AA\text{-}PIX2}$. In the illustrated example, $V_{AA\text{-}PIX2}$ is lower than $V_{AA\text{-}PIX1}$. In step 302, a predetermined amount of charge is injected into one or more of the photoconversion device 50 and floating diffusion region 16 by applying $V_{AA\text{-}PIX2}$. To apply the test voltage, $V_{AA\text{-}PIX2}$, to the floating diffusion region 16, the reset transistor 18 is operated. To apply the test voltage, $V_{AA\text{-}PIX2}$, to the photoconversion device 50, the antiblooming transistor 25 is operated. Alternatively, to apply the test voltage, $V_{AA\text{-}PIX2}$, to the photoconversion device 50, the transfer transistor 26 can be operated. In step 303, the pixel voltage is returned to the operational level, $V_{AA\text{-}PIX1}$.

Optionally, different test voltages can be applied to the photoconversion device 50 and floating diffusion region 16 such that different amounts of charge are injected into the photoconversion device 50 and floating diffusion region 16. For this, a first test voltage $V_{AA\text{-}PIX2}$-1 is applied to the floating diffusion region 16 as described above, and a second test voltage, $V_{AA\text{-}PIX2}$-2, is applied to the photoconversion device 50 as described above.

It should be understood that the pixel 10 can be tested multiple times under different conditions to obtain a variety of information about the pixel 10. For example, by applying test voltage, $V_{AA\text{-}PIX2}$, to the photoconversion device 50 and not the floating diffusion region 16, a test signal can be obtained that indicates the gate barrier of the transfer transistor 26 when the transfer transistor 26 gate is biased. Further, failed pixels can be identified and fixed pattern noise (FPN) can be determined as described below.

In step 304, a pixel signal, $V_{SIG}$ is read out by a conventional read out process via column line 31 to provide a test signal. If the test voltage, $V_{AA\text{-}PIX2}$, is applied to only one of the photoconversion device 50 and floating diffusion region 16, the test signal represents the charge injected into the respective device 50, 16. If the test voltage, $V_{AA\text{-}PIX2}$, is applied to both the photoconversion device 50 and floating diffusion region 16, one or two test signals can be obtained: a first signal representing the charge injected into the photoconversion device 50 and/or a second signal representing the charge injected into the floating diffusion region 16. As noted above, the amount of charge injected into the photoconversion device 50 and floating diffusion region 16 may be the same or different.

The test signal is then processed in step 305. The results of the test signal processing can be stored by the test circuitry 270 or by any storage device in communication with the imaging device. The photoconversion device 50 and/or the floating diffusion region 16 are set to a predetermined test voltage level $V_{AA\text{-}PIX2}$. Accordingly, if the pixel 10 is functioning as properly, the test signal should have a known value described herein as an expected signal. Deviations from the expected signal provide information about the characteristics of the pixel 10.

The test signal can be processed by test circuitry 270 to determine whether the test signal meets predetermined criteria, such as having a predetermined relationship to the expected test signal. For example, the criteria can be a range based on the expected signal, such as the expected signal value plus or minus a predetermined value. That is, if the test signal is expected to be a mid-level signal, e.g., 512 LSB for a 10-bit ADC, the criteria can be 512 LSB+/−n, where the value of n can be set by the manufacturer or user of the imaging device 200. Also, criteria can be applied to groups of pixels 10, such as a row or a column of pixels 10. For example, the criteria for a group of pixels 10 can be a certain number of pixels 10 within the group have a predetermined relationship to a respective expected signal. Further, the test signal can be processed to determine the fixed pattern noise (FPN) of the pixel 10 at $V_{AA\text{-}PIX2}$.

Steps 301-305 can be repeated where the pixel voltage is set to various predetermined test voltages, $V_{AA\text{-}PIX3}$, $V_{AA\text{-}PIX4}$ … $V_{AA\text{-}PIXn}$ at step 301. As the expected signal value will vary based on the predetermined voltage, different criteria can be applied to test signals at the different predetermined voltages. Alternatively, steps 301-304 can be repeated multiple times and the resulting test signals can be processed together during a single step 305.

Test signals from pixels 10 of each column can be used to measure FPN in column parallel ADC circuits of the device 200. To account for dark current in the FPN calculations, the time between injection of charge into the photoconversion device 50 and/or the floating diffusion region 16 and readout of the pixel signal $V_{SIG}$ is substantially the same as that of the integration time during normal operation for which FPN measurements are calculated. Test circuitry 270 determines the test signal mean for each column of pixel 10. Differences between the mean test signals for each column are attributable to the column parallel ADC circuits. Test signals for various test voltages ($V_{AA\text{-}PIX2}$, $V_{AA\text{-}PIX3}$, $V_{AA\text{-}PIX4}$ … $V_{AA\text{-}PIXn}$) are processed to determine a mean test signal for each column of pixels 10 at the various predetermined voltages to allow comparison of the column parallel ADC circuits over a range of voltages.

Optionally, the test circuitry 270 can be configured to modify the imaging device 200 operation in step 306 based on the results of step 305. For example, the test circuitry 270 can be configured to exclude signals from pixels 10 or groups of pixels 10 that fail to meet one or more of the predetermined criteria from any images generated by the imaging device 200. Alternatively, the test circuitry 270 can be configured to modify (e.g., correct or replace) signals from pixels 10 or groups of pixels 10 that fail to meet one or more of the predetermined criteria for use in images generated by the imaging device 200.

Figure 3B:
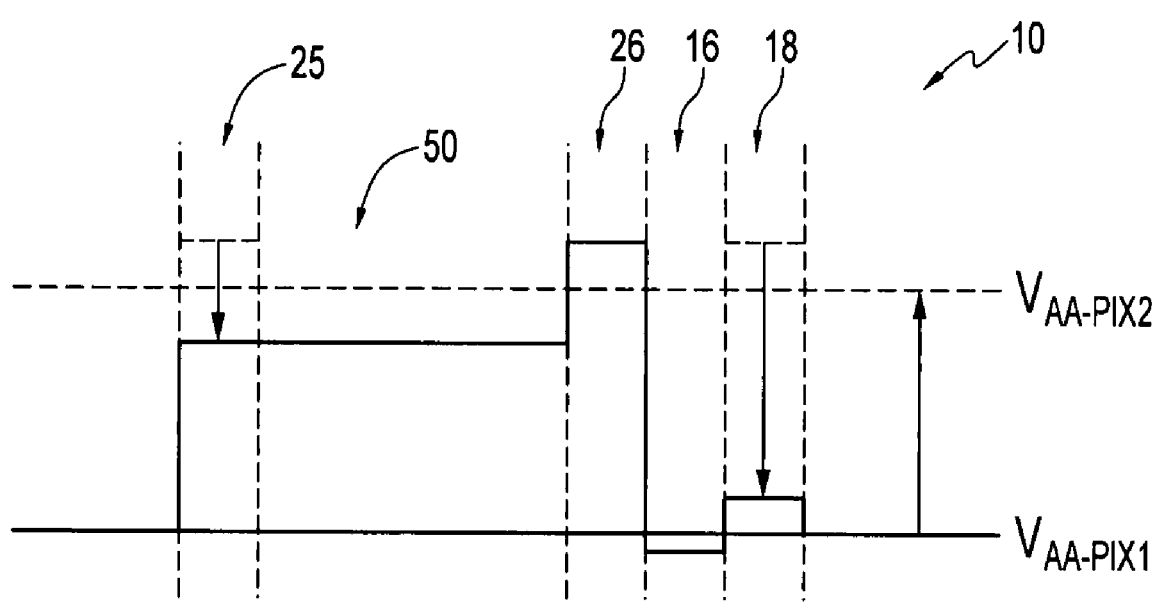
FIG. 3B is a potential well diagram of a pixel tested according to the method of FIG. 3A.
Figure 4:
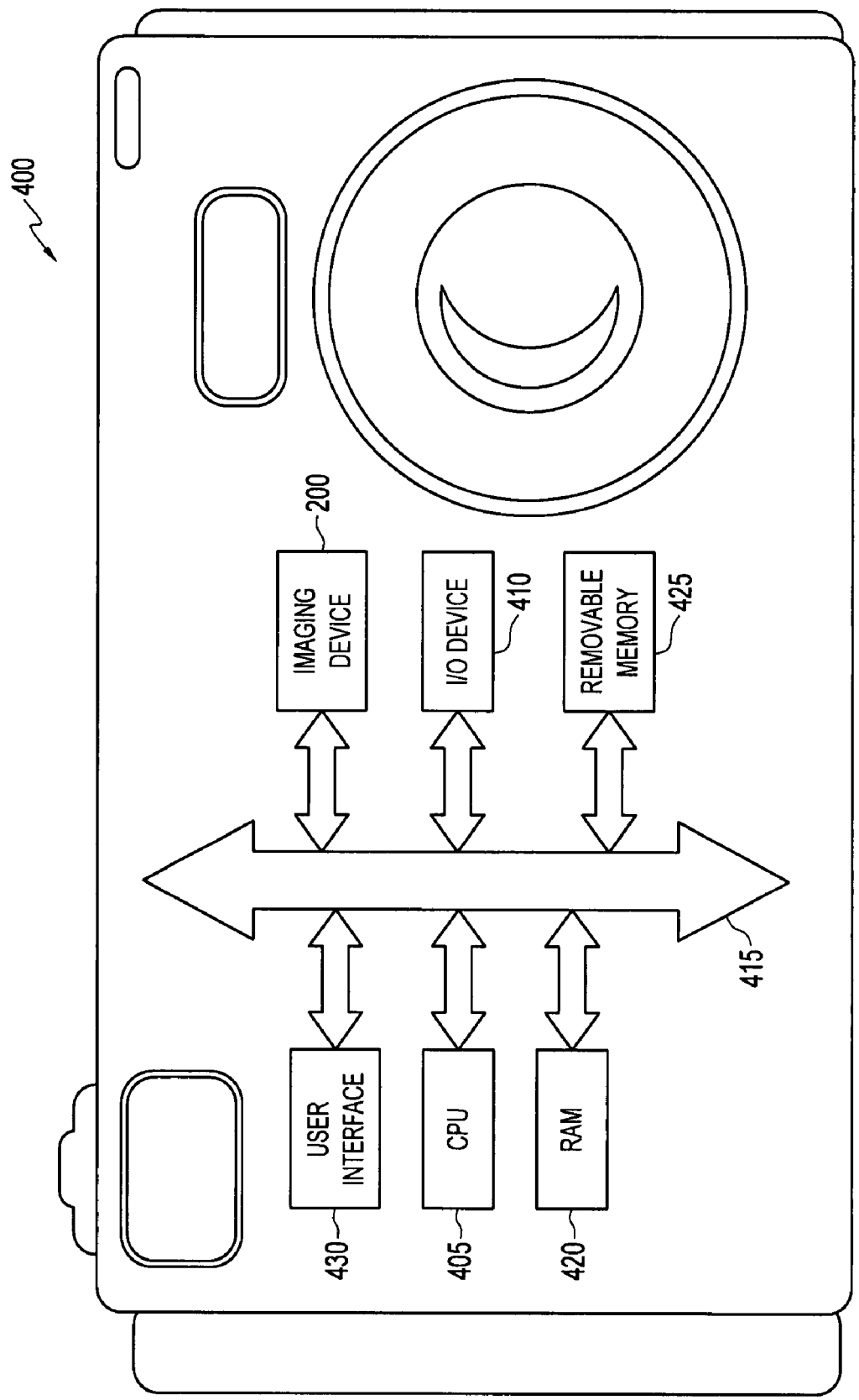
FIG. 4 is a block diagram of a system including the imaging device of FIG. 2.

Since the test methods of FIGS. 3A and 3B are controlled by test circuitry 270 of imaging device 200, the testing can be conducted by an end user of the imaging device 200, as well as the manufacturer or a manufacturer of products containing the imaging device 200. In this manner, an end user can make adjustments to the imaging device 200 over time. The test circuitry 270 can be configured to output the results of step 305 to a user through a user interface 430 (FIG. 4). Further, the user can be provided with one or more options for modifying the operation of the imaging device 200 in step 306.

That is, step 306 can be performed according to user input. For example, the end user can choose to exclude signals from pixels 10 or groups of pixels 10 that fail to meet one or more of the predetermined criteria from any images generated by the imaging device 200. Alternatively, the end user can choose to modify the signals from such failed pixels for use in an image. This allows the user to account for pixels that have degraded over time.

The test methods of FIGS. 3A and 3B are non-optical tests and do not require light. Therefore, as compared to conventional optical testing, which requires light to be turned on and off, the testing of the imaging device 200 on the assembly line using the FIG. 3A-3B method may be faster and, therefore, reduce the time and cost associated with testing a die.

FIG. 4 illustrates an imaging processor-based system 400, for example a camera system, which generally comprises a central processing unit (CPU) 405, such as a microprocessor, that communicates with an input/output (I/O) device 410 over a bus 415. The system 400 also includes an imaging device 200 constructed in accordance with the embodiments of the invention described herein and configured to perform the testing methods of FIGS. 3A-3B. Imaging device 200 also communicates with the CPU 405 over bus 415. Imaging device 200 may be combined with a processor, such as a CPU, digital signal processor, or microprocessor, with or without memory storage on a single integrated circuit or on a different chip than the processor.

The system 400 also includes random access memory (RAM) 420, and can include removable memory 425, such as flash memory, which also communicate with CPU 405 over the bus 415. System 400 can further include a user interface 430 for receiving input from a user and providing output to the user.

While the embodiments have been described in detail in connection with preferred embodiments known at the time, it should be readily understood that the invention is not limited to the disclosed embodiments. Rather, the embodiments can be modified to incorporate any number of variations, alterations, substitutions, or equivalent arrangements not heretofore described. For example, while the embodiments are described in connection with a CMOS imaging sensor, they can be practiced with any other type of imaging sensor (e.g., CCD, etc.).

What is claimed as new and desired to be protected by Letters Patent of the United States is:

1. An imaging device comprising:
an array of pixels, each pixel having a photoconversion device and a floating diffusion region;
a power supply configured to supply a pixel voltage; and
test circuitry configured to:
set the pixel voltage to a predetermined test voltage;
apply the test voltage to the photoconversion device and the floating diffusion region of at least one pixel;
set the pixel voltage to an operating voltage, wherein the operating voltage is different than the test voltage; and
read out a first and second test signals from the at least one pixel when the pixel voltage is at the operating voltage, the first test signal representing a voltage level of the floating diffusion region and the second test signal representing a voltage level of the photoconversion device.

2. The imaging device of claim 1, wherein the test circuitry is further configured to process the first and second test signals.

3. The imaging device of claim 2, wherein the test circuitry is configured to process at least one of the first and second test signals by determining whether the first or second test signal falls within a predetermined range.

4. The imaging device of claim 2, wherein the test circuitry is further configured to apply the test voltage to the photoconversion device and the floating diffusion region of a plurality of pixels, to read out a plurality of first and second test signals from a plurality of pixels, and to process the plurality of first and second test signals by determining whether a predetermined number of the plurality of first and second test signals falls within a predetermined range.

5. The imaging device of claim 2, wherein the test circuitry is further configured to modify operation of the imaging device based on the results of the processing.

6. The imaging device of claim 1, wherein the test circuitry is further configured repeat the acts of applying, setting and reading out, wherein the test voltage is a different predetermined voltage each time the pixel voltage is set to the test voltage.

7. A processor system comprising:
a processor; and
an imaging device coupled to the processor, the imaging device comprising:
an array of pixels, each pixel having a photoconversion device and a floating diffusion region;
a power supply configured to supply a pixel voltage; and
testing circuitry configured to:
set the pixel voltage to a predetermined test voltage;
apply the test voltage to the photoconversion device and the floating diffusion region;
set the pixel voltage to an operating voltage, wherein the operating voltage is different than the test voltage;
read out first and second test signals from the pixel, the first test signal representing a voltage level of the floating diffusion region and the second test signal representing a voltage level of the photoconversion device; and
process the test first and second test signals.

8. The system of claim 7, further comprising a user interface.

9. The system of claim 8, wherein the test circuitry is configured to process the first and second test signals by applying a predetermined criteria to the first and second test signals in response to input from the user interface.

10. The system of claim 9, wherein the test circuitry is further configured to modify operation of the imaging device based on the results of the processing and in response to input from the user interface.

11. The system of claim 10, wherein the test circuitry is configured to modify the operation of the imaging device by excluding a pixel signal from a failed pixel in an image generated by the imaging device during normal operation, the failed pixel being a pixel for which a corresponding first or second test signal did not meet the predetermined criteria.

12. The system of claim 7, wherein the system is employed in a camera.

13. A method of testing an imaging device, the method comprising:
performing a testing operation on at least a portion of the pixels of a pixel array, for each pixel tested, the testing operation comprising:
applying a predetermined test voltage to a photoconversion device and a floating diffusion region; and
reading out first and second test signals from the pixel, the first test signal representing a voltage on the floating diffusion region, the second test signal representing a voltage on the photoconversion device.

14. The method of claim 13, wherein the testing operation further comprises processing the first and second test signals.

15. The method of claim 14, wherein processing the test first and second signals comprises determining whether each test signal falls within a predetermined range.

16. The method of claim 14, wherein the testing operation further comprising processing the first and a second test signals from a plurality of pixels by determining whether a predetermined number of the first and second test signals fall within a predetermined range.

17. The method of claim 14, wherein the testing operation further comprises repeating the acts of applying and reading out, wherein the test voltage is different for each act of applying.

18. The method of claim 14, wherein the testing operation further comprises identifying defective pixels and modifying operation of the imaging device based on the results of the processing.

19. The method of claim 18, wherein modifying the operation of the imaging device comprises excluding a pixel signal from a defective pixel in an image generated by the imaging device, the defective pixel being a pixel for which a corresponding test signal did not meet predetermined criteria.

20. The method of claim 18, wherein modifying the operation of the imaging device comprises modifying a pixel signal from a defective pixel in an image generated by the imaging device during normal operation, the defective pixel being a pixel for which a corresponding test signal did not meet predetermined criteria.

21. The method of claim 18, wherein the portion of the pixels are arranged in columns and wherein the processing comprises calculating a mean test signal for each column.

22. The method of claim 13, wherein the testing operation does not require light.

23. A method of performing a testing operation on a pixel, the method comprising:
    providing a pixel having a photoconversion device and a floating diffusion region;
    applying a first test voltage to the photoconversion device and a second test voltage to the floating diffusion region;
    reading out a first test signal from the pixel representing a voltage on the floating diffusion region;
    reading out a second test signal from the pixel representing a voltage on the photoconversion device; and
    applying a predetermined criteria to the first and second test signals.

24. The method of claim 23, wherein applying the predetermined criteria to the first and second test signals comprises comparing the first and second test signals to an expected signal.

25. The method of claim 23, wherein applying the predetermined criteria to the first and second test signals comprises determining whether the test signals fall within a predetermined range.

26. The method of claim 23, wherein the first and second test signals do not represent light received by the photoconversion device.

27. The method of claim 23, wherein the first test voltage is different than the second test voltage.

* * * * *